United States Patent
Lu et al.

(10) Patent No.: US 12,299,220 B2
(45) Date of Patent: May 13, 2025

(54) MOUSE PAD

(71) Applicant: DEXIN CORPORATION, New Taipei (TW)

(72) Inventors: Ho-Lung Lu, New Taipei (TW); Pai-Yang Chou, New Taipei (TW)

(73) Assignee: DEXIN CORPORATION, New Taipei (TW)

( * ) Notice: Subject to any disclaimer, the term of this patent is extended or adjusted under 35 U.S.C. 154(b) by 0 days.

(21) Appl. No.: 17/351,365

(22) Filed: Jun. 18, 2021

(65) Prior Publication Data

US 2022/0244796 A1    Aug. 4, 2022

(30) Foreign Application Priority Data

Feb. 3, 2021   (TW) .................................. 110103974

(51) Int. Cl.
| | |
|---|---|
| *G06F 3/039* | (2013.01) |
| *G06F 1/3234* | (2019.01) |
| *G06F 3/0354* | (2013.01) |
| *H02J 50/12* | (2016.01) |
| *H02J 50/80* | (2016.01) |

(52) U.S. Cl.
CPC .......... *G06F 3/0395* (2013.01); *G06F 1/3259* (2013.01); *G06F 3/03543* (2013.01); *H02J 50/12* (2016.02); *H02J 50/80* (2016.02)

(58) Field of Classification Search
CPC .. G06F 3/0395; G06F 3/03543; G06F 1/3259; H02J 50/12; H02J 50/80
See application file for complete search history.

(56) References Cited

U.S. PATENT DOCUMENTS

| | | | |
|---|---|---|---|
| 2009/0039828 A1* | 2/2009 | Jakubowski | H02J 50/80 320/106 |
| 2015/0180271 A1* | 6/2015 | Angara | H02J 50/90 320/108 |
| 2015/0241999 A1* | 8/2015 | Bae | G06F 3/03543 345/163 |
| 2017/0279284 A1* | 9/2017 | Lim | H02J 7/0024 |

OTHER PUBLICATIONS

Onsemi, Wireless Charging Technology—Fundamentals of A4WP Standard, 2016, youtube.com, https://www.youtube.com/watch?v=RO2AJ1-k9Eg (Year: 2016).*

* cited by examiner

*Primary Examiner* — Hang Lin
(74) *Attorney, Agent, or Firm* — Li & Cai Intellectual Property (USA) Office

(57) ABSTRACT

A mouse pad that is adapted to a wireless charging transmitter and operates in cooperation with a wireless mouse is provided. The mouse pad includes a main body and a secondary resonant coil circuit disposed inside the main body. The secondary resonant coil circuit wirelessly receives a first electromagnetic energy provided by the wireless charging transmitter arranged outside the main body, and then converts the first electromagnetic energy into a working power for the secondary resonant coil circuit. The secondary resonant coil circuit relays the working power, converts the working power into the second electromagnetic energy, and then wirelessly outputs a second electromagnetic energy to the wireless mouse.

1 Claim, 5 Drawing Sheets

MOUSE PAD

CROSS-REFERENCE TO RELATED PATENT APPLICATION

This application claims the benefit of priority to Taiwan Patent Application No. 110103974, filed on Feb. 3, 2021. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a mouse pad, and more particularly to a mouse pad that is capable of wirelessly transmitting power.

BACKGROUND OF THE DISCLOSURE

Among wireless mice used with computers or laptops, one type of the wireless mice has a charging dock, and the wireless mouse is plugged into the charging dock for charging through a built-in battery charging module of the wireless mouse; another type of the wireless mice has a battery that must be replaced after the charge in the battery is used up. The foregoing two types of the wireless mice, i.e., having either the charging dock or the battery, may cause a user to experience a certain degree of inconvenience when charging or changing the battery.

SUMMARY OF THE DISCLOSURE

In response to the above-referenced technical inadequacies, the present disclosure provides a mouse pad that is adapted to a wireless charging transmitter and operates in cooperation with a wireless mouse.

In one aspect, the present disclosure provides a mouse pad, adapted to a wireless charging transmitter and operating in cooperation with a wireless mouse. The mouse pad includes a main body and a secondary resonant coil circuit. The secondary resonant coil circuit is disposed inside the main body. The secondary resonant coil circuit wirelessly receives a first electromagnetic energy provided by the wireless charging transmitter arranged outside the main body, and then converts the first electromagnetic energy into a working power for the secondary resonant coil circuit. The secondary resonant coil circuit relays the working power. The secondary resonant coil circuit converts the working power into a second electromagnetic energy, and then wirelessly outputs the second electromagnetic energy to the wireless mouse.

In another aspect, the present disclosure provides a mouse pad, adapted to a wireless charging transmitter and operating in cooperation with a wireless mouse. The mouse pad includes a main body, a primary resonant coil circuit, a wireless charging transmission control circuit, and a secondary resonant coil circuit. The wireless charging transmission control circuit is electrically connected to the primary resonant coil circuit. The wireless charging transmission control circuit, the primary resonant coil circuit, and the secondary resonant coil circuit are arranged inside the main body, the secondary resonant coil circuit and the primary resonant coil circuit are not wiredly connected to each other, and the secondary resonant coil circuit and the wireless charging transmission control circuit are not wiredly connected to each other. The secondary resonant coil circuit wirelessly receives a first electromagnetic energy provided by the primary resonant coil circuit, and then converts the first electromagnetic energy into a working power for the secondary resonant coil circuit. The secondary resonant coil circuit relays the working power, the secondary resonant coil circuit converts the working power into a second electromagnetic energy, and then wirelessly outputs the second electromagnetic energy to the wireless mouse.

In yet another aspect, the present disclosure provides a mouse pad including a main body, a primary resonant coil circuit, and a wireless charging transmission control circuit. The wireless charging transmission control circuit is disposed inside the main body and electrically connected to the primary resonant coil circuit.

One of the beneficial effects of the mouse pad of the present disclosure is that, the mouse pad integrates various resonant coil circuits and wireless charging transmitters to wirelessly charge the wireless mouse, such that the mouse pad of the present disclosure can be arranged into multiple wireless charging connection configurations, and a flexibility of a power supply configuration of the mouse pad is enhanced.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
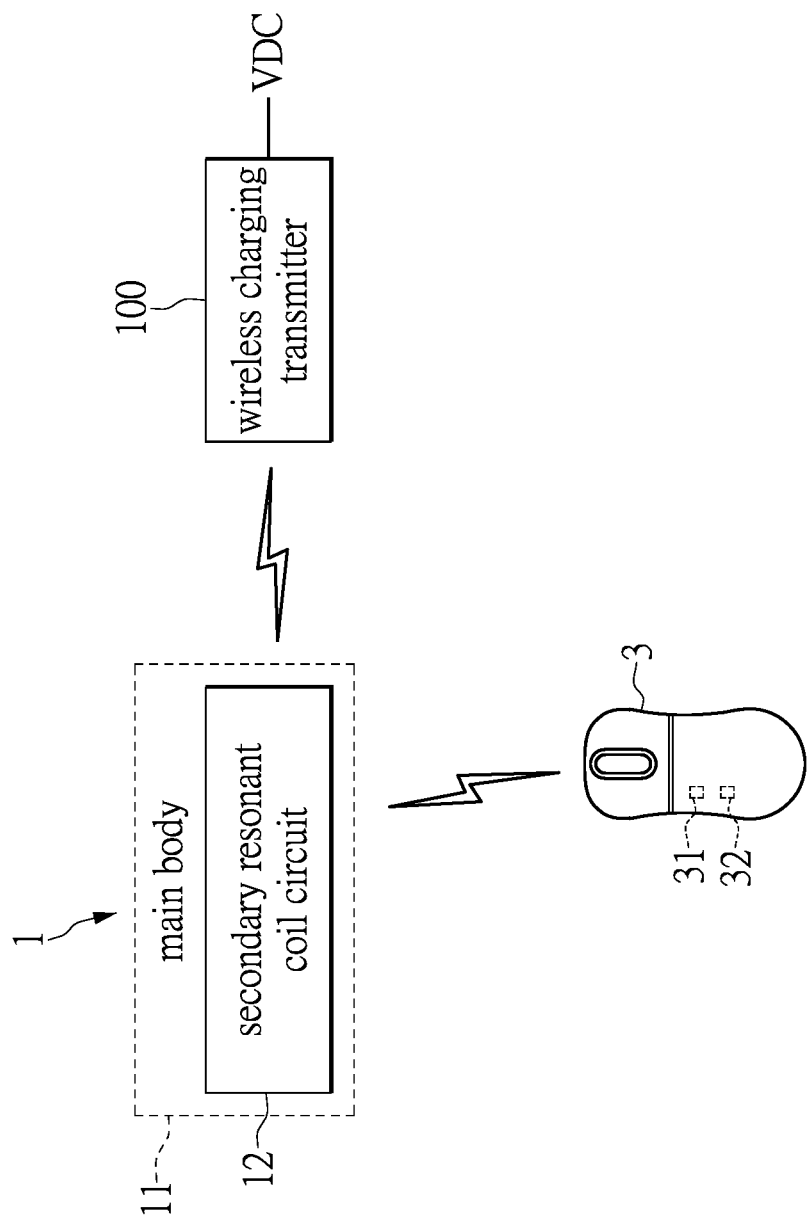
FIG. 1 is a schematic view showing a mouse pad working in cooperation with a wireless charging transmitter and charging a wireless mouse according to one embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Embodiment for Passive Wireless Charging Mouse Pad

Figure 2:
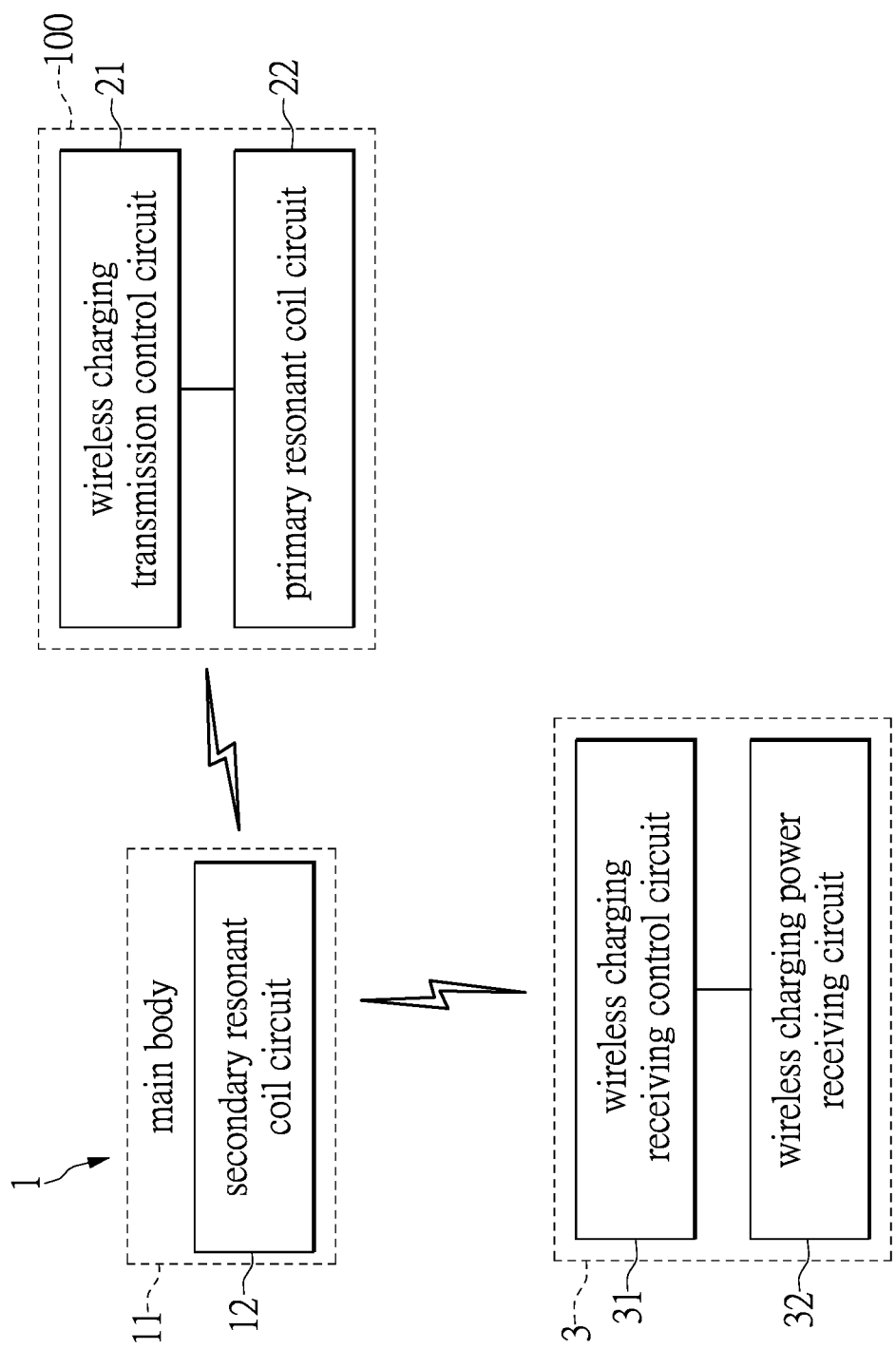
FIG. 2 is a block diagram showing details of the mouse pad working in cooperation with the wireless charging transmitter and charging the wireless mouse according to one embodiment of the present disclosure.

References are made to FIG. 1 and FIG. 2. FIG. 1 is a schematic view showing a mouse pad working in cooperation with a wireless charging transmitter and charging a wireless mouse according to one embodiment of the present disclosure. FIG. 2 is a block diagram showing details of the mouse pad working in cooperation with the wireless charging transmitter and charging the wireless mouse according to one embodiment of the present disclosure. As shown in FIG. 1, a mouse pad 1 is adapted to operate with a wireless charging transmitter 100 and a wireless mouse 3. The mouse pad 1 includes a main body 11 and a secondary resonant coil circuit 12, and the secondary resonant coil circuit 12 is arranged inside the main body 11.

In one embodiment, the main body 11 can be a one-piece structure or a multi-piece structure, for example, the main body 11 can be made of a single base material, a reflective material, or a non-slip material, but the present disclosure is not limited thereto.

In one embodiment, the secondary resonant coil circuit 12 passively receives power from a wireless charging transmitter 100, such that the secondary resonant coil circuit 12 wirelessly receives a first electromagnetic energy provided by the wireless charging transmitter 100 arranged outside the main body 11. The secondary resonant coil circuit 12 converts the first electromagnetic energy into a working power for the secondary resonant coil circuit 12. Furthermore, a physical connection (e.g., a wired connection) between the mouse pad 1 and the wireless charging transmitter 100 is not required. That is to say, the secondary resonant coil circuit 12 passively and wirelessly receives the first electromagnetic energy, and a power source of the wireless charging transmitter 100 can be a wired power transmission or a built-in power supply. Therefore, the secondary resonant coil circuit 12 can further relay the working power. For example, the secondary resonant coil circuit 12 can convert the working power into a second electromagnetic energy and then wirelessly output the second electromagnetic energy to the wireless mouse 3 for charging or supplying power to the wireless mouse 3.

The wireless mouse 3 has a wireless charging receiving control circuit 31 and a wireless charging power receiving circuit 32, so that the wireless mouse 3 is able to receive power. The wireless mouse 3 can obtain the second electromagnetic energy provided by the mouse pad 1 through the wireless charging power receiving circuit 32. The wireless charging power receiving circuit 32 can be, for example, a related circuit including a coil for wirelessly obtaining the second electromagnetic energy provided by the secondary resonant coil circuit 12, and then the second electromagnetic energy is converted into power by the wireless charging receiving control circuit 31 for the wireless mouse 3.

Specifically, the secondary resonant coil circuit 12 in the mouse pad 1 is similar to a relay station for power transmission, and can be used for power transmission between the wireless charging transmitter 100 and the wireless mouse 3. For example, after the secondary resonant coil circuit 12 passively and wirelessly receives the first electromagnetic energy provided by the wireless charging transmitter 100, the first electromagnetic energy can be converted into the working power for the secondary resonant coil circuit 12, and the secondary resonance coil circuit 12 can relay the working power. The secondary resonance coil circuit 12 then converts the working power into the second electromagnetic energy, and wirelessly outputs the second electromagnetic energy to the wireless mouse 3.

In one embodiment, as shown in FIG. 2, the wireless charging transmitter 100 has a wireless charging transmission control circuit 21 and a primary resonant coil circuit 22. The wireless charging transmission control circuit 21 of the wireless charging transmitter 100 is coupled to the primary resonant coil circuit 22 of the wireless charging transmitter 100, such that the primary resonant coil circuit 22 can actively provide electromagnetic energy to the secondary resonant coil circuit 12, and the mouse pad 1 can be arranged to passively receive the electromagnetic energy. In addition, power can be transmitted between the secondary resonant coil circuit 12 and the wireless charging power receiving circuit 32 through the wireless charging receiving control circuit 31 and the wireless charging power receiving circuit 32 of the wireless mouse 3, thus forming a power supply configuration of the passive wireless connection of the mouse pad 1 in this embodiment. Therefore, the flexibility of the power supply configuration of the wireless charging connection is enhanced.

In this embodiment, the secondary resonant coil circuit 12 of the mouse pad 1 obtains the first electromagnetic energy provided by the primary resonant coil circuit 22 through magnetic resonance, and the secondary resonant coil circuit 12 of the mouse pad 1 provides the second electromagnetic energy through magnetic resonance, such that the second electromagnetic energy is received by the wireless charging power receiving circuit 32 of the wireless mouse 3. In addition, how the primary resonant coil circuit 22 and the secondary resonant coil circuit 12 transmit power through magnetic resonance is known to people having ordinary skill in the art, and specific implementations of the primary resonant coil circuit 22 and the secondary resonant coil circuit 12 are not described in detail herein. In addition, how the wireless charging power receiving circuit 32 obtains the electromagnetic energy provided by the secondary resonant coil circuit 12 through magnetic resonance is known to people having ordinary skill in the art, and a specific implementation of the wireless charging power receiving circuit 32 is not described in detail herein.

Since the mouse pad 1 of this embodiment obtains the power provided by the wireless charging transmitter 100 through magnetic resonance, the mouse pad 1 is not required to be connected to an external power through wired transmission to obtain power, and the mouse pad 1 charges or supplies power to the wireless mouse 3 through magnetic resonance. Therefore, a user can completely avoid the inconveniences of wired transmission when operating the wireless mouse 3 on the mouse pad 1, and the mouse pad 1 can be arranged at any position, which can effectively enhance the flexibility of the power supply configuration of the mouse pad 1 charging the wireless mouse 3.

Figure 3:
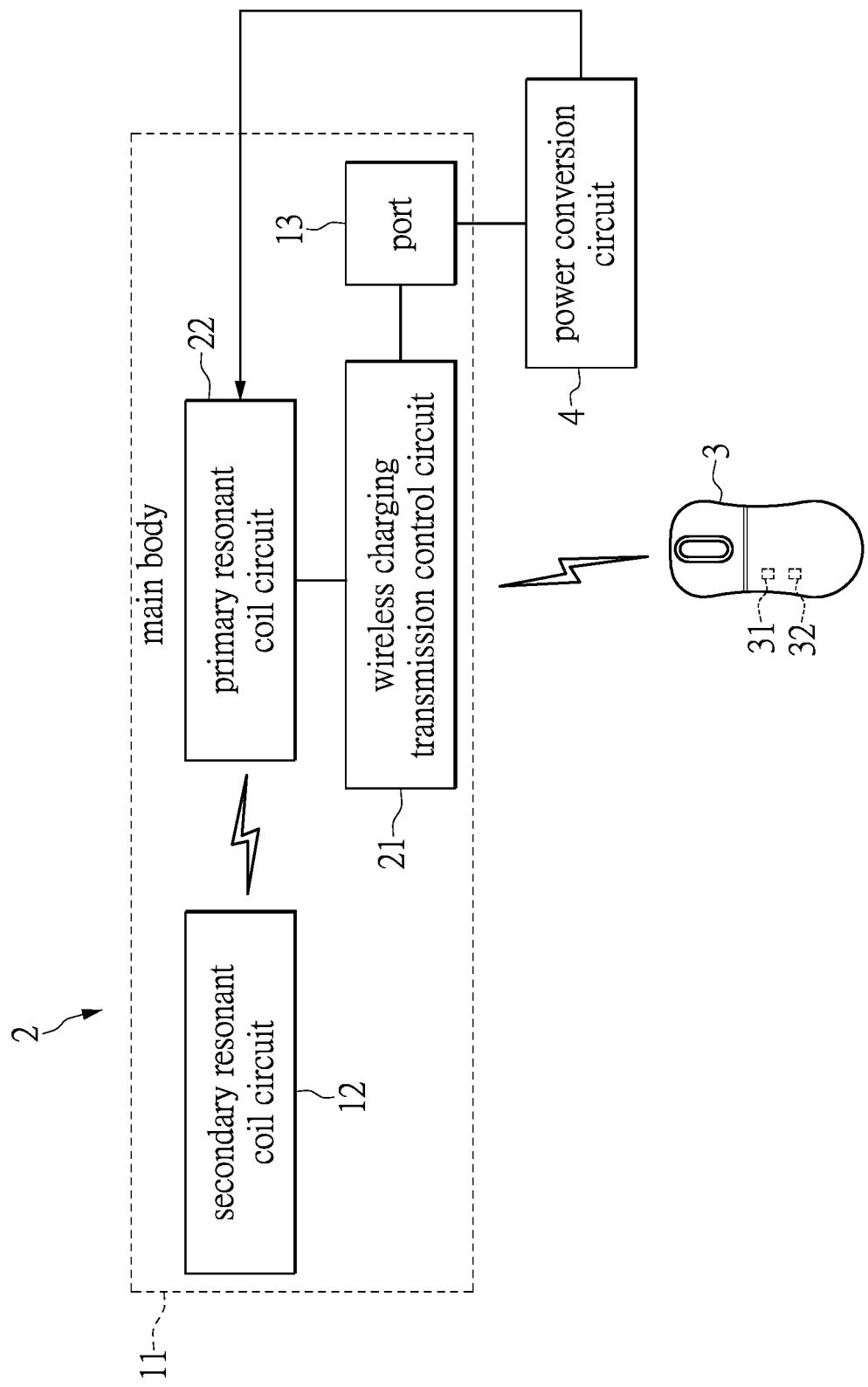
FIG. 3 is a functional block diagram showing the wireless mouse being charged with an external power source outside of the mouse pad according to one embodiment of the present disclosure.

Referring to FIG. 3, FIG. 3 is a functional block diagram showing the wireless mouse being charged with an external power source outside of the mouse pad according to one embodiment of the present disclosure. A mouse pad 2 is adapted to be operated with a wireless mouse 3. The mouse pad 2 includes a main body 11, a primary resonant coil circuit 22, a wireless charging transmission control circuit 21, and a primary resonant coil circuit 12 that are all integrated and disposed inside the mouse pad 1, and the wireless charging transmission control circuit 21 is electrically connected to the primary resonant coil circuit 22.

In one embodiment, the wireless charging transmission control circuit 21, the primary resonant coil circuit 22, and the secondary resonant coil circuit 12 are all disposed inside the main body 11 without additionally requiring a wireless charging transmitter. No physical (i.e., wired) circuit connection is defined between the secondary resonant coil circuit 12 and the primary resonant coil circuit 22, and no physical circuit connection is defined between the secondary resonant coil circuit 12 and the wireless charging transmission control circuit 21.

In this embodiment, the mouse pad 2 can further include a port 13 that is electrically connected to the wireless charging transmission control circuit 21, such that the mouse pad 2 can power or charge the wireless mouse 3. The wireless charging transmission control circuit 21 is electrically connected to a power conversion circuit 4 through the port 13, and the power conversion circuit 4 provides the working voltage of the primary resonant coil circuit 22.

In one embodiment, the secondary resonant coil circuit 12 is passively powered by the primary resonant coil circuit 22, so that the secondary resonant coil circuit 12 wirelessly receives a first electromagnetic energy provided by the primary resonant coil circuit 22. The secondary resonant coil circuit 12 then converts the first electromagnetic energy into a working power for the secondary resonant coil circuit 12, and the secondary resonant coil circuit 12 relays the working power. The secondary resonance coil circuit 12 converts the working power into the second electromagnetic energy, and then wirelessly outputs wirelessly outputs a second electromagnetic energy to wireless mouse 3.

In one embodiment, the secondary resonant coil circuit 12 of the mouse pad 2 obtains the first electromagnetic energy provided by the primary resonant coil circuit 22 through magnetic resonance, and the secondary resonant coil circuit 12 of the mouse pad 2 provides the second electromagnetic energy through magnetic resonance, such that the second electromagnetic energy is received by the wireless mouse 3.

Therefore, the mouse pad 2 of this embodiment integrates the secondary resonant coil circuit 12, the primary resonant coil circuit 22, and the wireless mouse 3, so that the mouse pad 2 of this embodiment can be arranged in a passive wireless power transmission connection mode, without using an external wireless charging transmitter, which can effectively enhance the flexibility of the power supply configuration of the mouse pad 2 charging the wireless mouse 3.

In one embodiment, the possibility of the power conversion circuit 4 being directly integrated into the mouse pad 2 is not ruled out. The power conversion circuit 4 can be an alternating current (AC) to direct current (DC) power conversion circuit or a DC to DC power conversion circuit, but the present disclosure is not limited thereto.

Embodiment for Active Wireless Charging Mouse Pad

Figure 4:
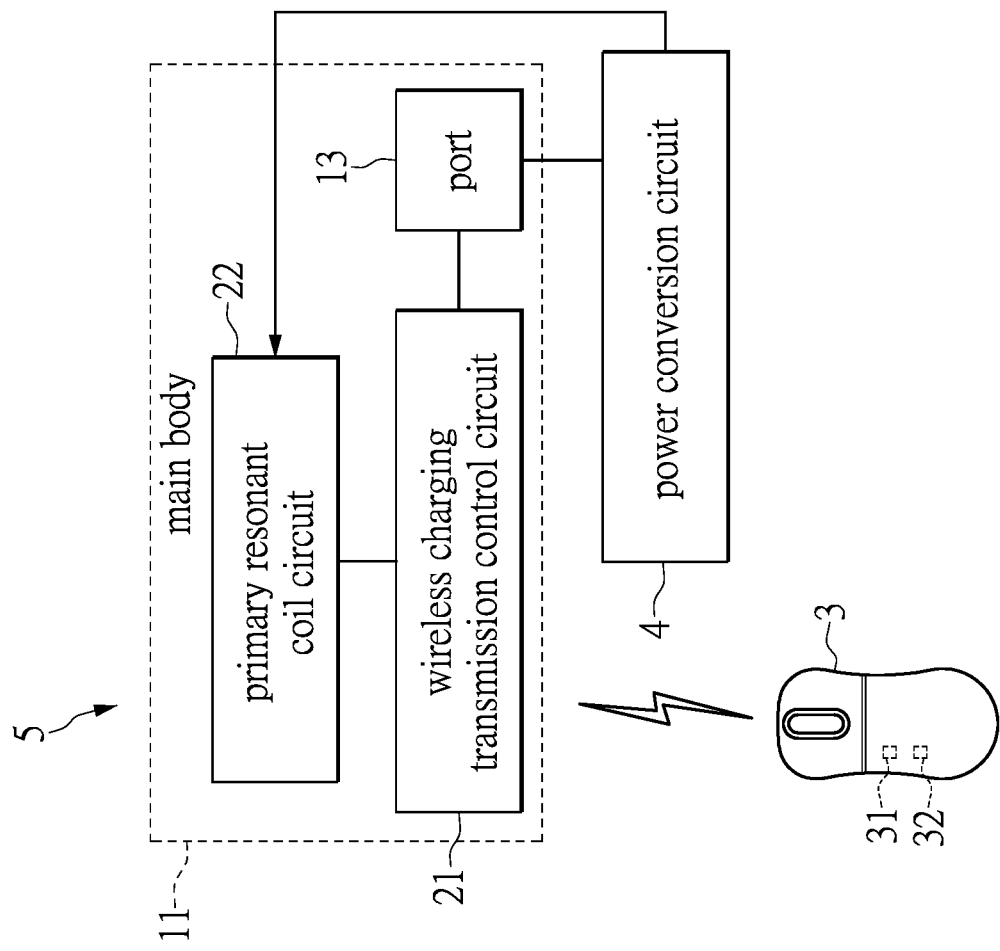
FIG. 4 is a functional block diagram showing the wireless mouse being charged with an external power source outside of the mouse pad without including a secondary resonant coil circuit, according to one embodiment of the present disclosure.

References are made to FIG. 3 and FIG. 4. FIG. 4 is a functional block diagram showing the wireless mouse being charged with an external power source outside of the mouse pad without including a secondary resonant coil circuit, according to one embodiment of the present disclosure. In this embodiment, a mouse pad 5, as shown in FIG. 4, can also charge the wireless mouse 3 without the secondary resonant coil circuit 12.

Similarly, the wireless charging transmission control circuit 21 is electrically connected to the port 13, so that the wireless charging transmission control circuit 21 is electrically connected to the power conversion circuit 4 through the port 13, and the power conversion circuit 4 provides the working voltage for the primary resonant coil circuit 22. The wireless mouse 3 wirelessly receives a first electromagnetic energy provided by the primary resonant coil circuit 22, and the primary resonant coil circuit 22 of the mouse pad 5 can actively send electromagnetic energy to the wireless mouse 3 through magnetic resonance, which can usually be regarded as an active wireless charging circuit that can actively send wireless electromagnetic energy, but the present disclosure is not limited thereto. In one embodiment, the primary resonant coil circuit 22 of the mouse pad 5 provides the first electromagnetic energy through magnetic resonance, such that the first electromagnetic energy is received by the wireless charging power receiving circuit 32 of the wireless mouse 3.

Therefore, the mouse pad 5 of this embodiment only integrates the primary resonant coil circuit 22, the port 13, the power conversion circuit 4, and the wireless mouse 3, such that the mouse pad 5 of this embodiment can be arranged in an active wireless power transmission connection mode, without using the external wireless charging transmitter, which can effectively enhance the flexibility of the power supply configuration of the mouse pad 2 charging the wireless mouse 3.

Embodiment for Mouse Pad Having Built-In Battery

Figure 5:
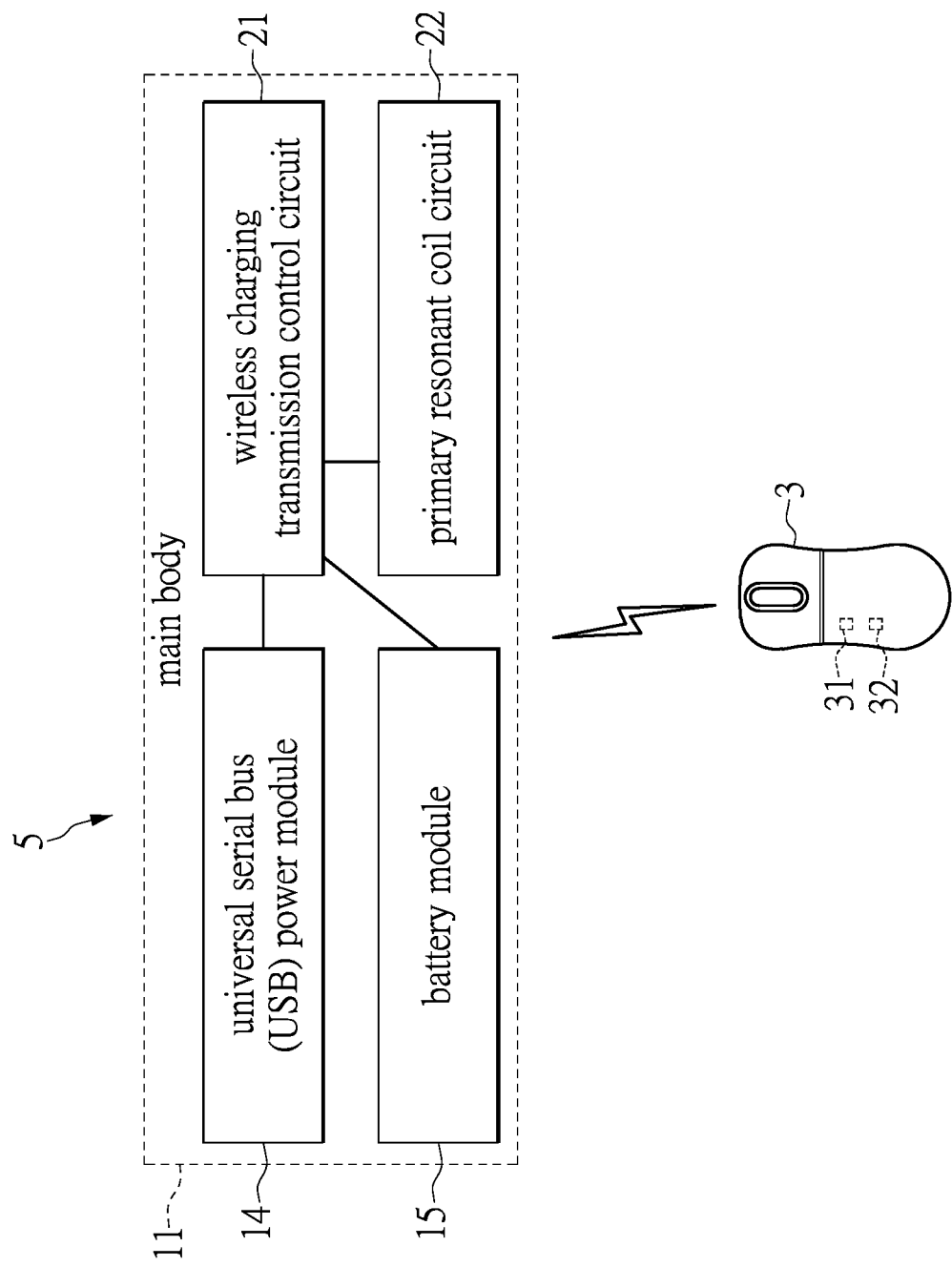
FIG. 5 is a block diagram showing a built-in battery inside the mouse pad charging the wireless mouse according to one embodiment of the present disclosure.

Referring to FIG. 5, FIG. 5 is a block diagram showing a built-in battery inside the mouse pad charging the wireless mouse according to one embodiment of the present disclosure. The wireless charging transmission control circuit 21 of the mouse pad 5 is disposed inside the main body 11 and is electrically connected to the primary resonance coil circuit 22. In this embodiment, the mouse pad 5 further includes a universal serial bus (USB) power module 14 and a battery module 15. The battery module 15 can be a dry cell, a mercury battery, a lithium battery, etc., which can be used for providing power supply, such as a battery module that requires replacement after a single-use or a charging battery module. The USB power module 14 and the battery module 15 are each electrically connected to the wireless charging transmission control circuit 21.

In one embodiment, the mouse pad 5 operates in cooperation with the wireless mouse 3. The wireless mouse 3 receives a first electromagnetic energy generated through magnetic resonance provided by the primary resonant coil circuit 22, and then converts the first electromagnetic energy into the working power for the wireless mouse 3. When the battery module 15 is a rechargeable battery module, the USB power module 14 is connected to an external power source, and then the wireless charging transmission control circuit 21 charges the battery module 15 through a wired power charging protocol. The wired power charging protocol is a USB wired power charging protocol. The wired power charging protocol is a USB Type-C charging protocol, such that the wireless charging transmission control circuit 21 performs a two-way power delivery (PD).

In one embodiment, the USB can also be USB 2.0 or USB 3.0. USB 2.0 works at a voltage of 5 VDC, and USB 3.0 works at a voltage between 5 VDC and 20 VDC. Therefore, the wired power charging protocol is provided by the USB. That is to say, when the battery module 15 is a rechargeable battery module, the battery module 15 can be charged through having the USB power module 14 plugged into the power source for charging. After the mouse pad 5 of this embodiment charges the battery module 15 and the battery module 15 is charged or fully charged, the battery module 15 can be used to power or charge the wireless mouse 3 through the wireless charging transmission control circuit 21 and the primary resonant coil circuit 22. In addition, the USB power module 14 can also be plugged into the power source and directly power or charge the wireless mouse 3 through the wireless charging transmission control circuit 21 and the primary resonant coil circuit 22. Therefore, in this embodiment, the mouse pad 5 can not only store power, but also power or charge the wireless mouse 3 by receiving power from a wired external power supply, or by power stored in or received from charging the battery module 15, which allows the power supply configuration to have high flexibility.

Beneficial Effects of the Embodiments

One of the beneficial effects of the mouse pad of the present disclosure is that, the mouse pad integrates various resonant coil circuits and wireless charging transmitters to form a passive wireless charging configuration or an active wireless charging configuration for the mouse pad to transmit or receive electromagnetic energy through magnetic resonance, and to wirelessly power or charge the wireless mouse, such that the mouse pad of the present disclosure can be arranged into multiple wireless charging connection configurations, in which the flexibility of the power supply configuration of the wireless charging connection of the mouse pad is enhanced.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A mouse pad, adapted to a wireless charging transmitter and operating in cooperation with a wireless mouse, the mouse pad comprising:
a main body;
a primary resonant coil circuit;
a wireless charging transmission control circuit electrically connected to the primary resonant coil circuit;
a secondary resonant coil circuit; and
a port electrically connected to the wireless charging transmission control circuit;
wherein the wireless charging transmission control circuit is electrically connected to a power conversion circuit through the port, and the power conversion circuit provides a working voltage for the primary resonant coil circuit;
wherein the wireless charging transmission control circuit, the primary resonant coil circuit, and the secondary resonant coil circuit are arranged inside the main body, the secondary resonant coil circuit and the primary resonant coil circuit are not wiredly connected to each other, and the secondary resonant coil circuit and the wireless charging transmission control circuit are not wiredly connected to each other;
wherein the secondary resonant coil circuit wirelessly receives a first electromagnetic energy provided by the primary resonant coil circuit through magnetic resonance, and then converts the first electromagnetic energy into a working power for the secondary resonant coil circuit;
wherein the secondary resonant coil circuit relays the working power, the secondary resonant coil circuit converts the working power into a second electromagnetic energy, and then wirelessly outputs the second electromagnetic energy to the wireless mouse through magnetic resonance.

* * * * *